March 21, 1961 G. G. RUFFINO 2,975,741
FOOD PRODUCT MACHINE
Filed Oct. 9, 1956 2 Sheets-Sheet 1

Gabriel G. Ruffino
INVENTOR.

March 21, 1961  G. G. RUFFINO  2,975,741
FOOD PRODUCT MACHINE
Filed Oct. 9, 1956  2 Sheets-Sheet 2

Gabriel G. Ruffino
INVENTOR.

BY Clarence A. O'Brien
and Harvey B. Jacobson
Attorneys

# United States Patent Office 2,975,741
Patented Mar. 21, 1961

2,975,741

FOOD PRODUCT MACHINE

Gabriel G. Ruffino, 132½ N. Soto St.,
Los Angeles 33, Calif.

Filed Oct. 9, 1956, Ser. No. 614,943

5 Claims. (Cl. 113—42)

This invention relates to appliances to facilitate the production of food products and more particularly to an appliance for aiding in making certain fried or baked products.

An object of the invention is to provide an appliance for making tortillas, tacos, tostadas, fritos, enchiladas, quesadillas etc. of uniform size, thickness and weight whereby a more uniform product is obtained and whereby the cooking time, temperatures, etc. may be more easily and evenly calculated.

A more specific object of the invention is to provide an appliance on which to accommodate the tortilla or other food product dough after which it is formed on a tinfoil, aluminum foil or other film of analogous material in the proper shape and size.

A further object of the invention is to provide such an appliance with means to cut the foil to shape, this being automatic in the shaping of the dough to the proper size.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
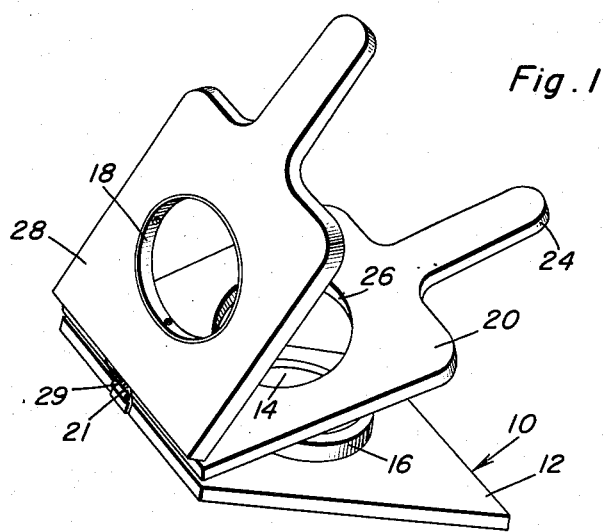
Figure 1 is a perspective view of an appliance which is constructed in accordance with the invention, this appliance having a cutter which automatically severs the metal foil which is finally arranged beneath the food product.
Figure 2:
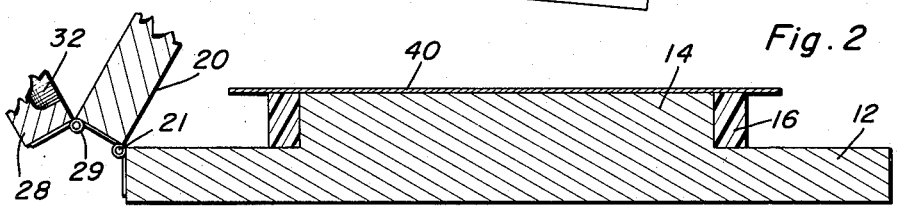
Figure 2 is a longitudinal sectional view showing the initial step in the operation and use of the appliance of Figure 1.
Figure 3:
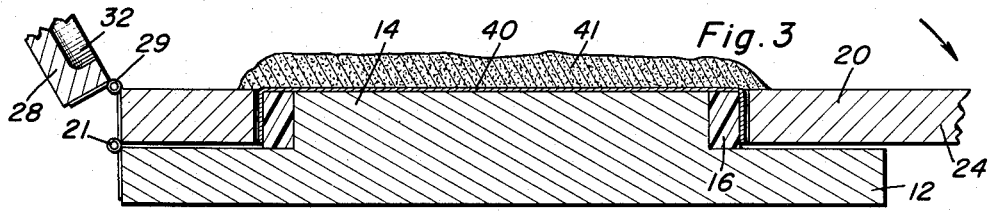
Figure 3 is a longitudinal sectional view showing the second step which is to be taken.
Figure 6:
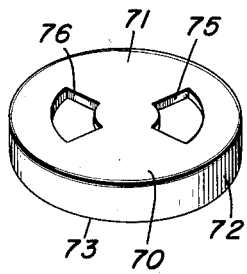
Figure 6 is a perspective view of a part of a modification of the appliance.
Figure 7:
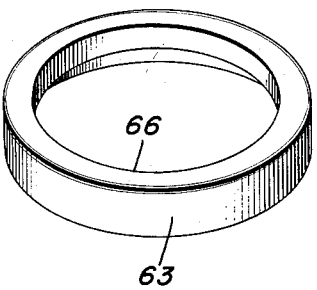
Figure 7 is a perspective view of a ring which is used in the second embodiment of the invention.
Figure 8:
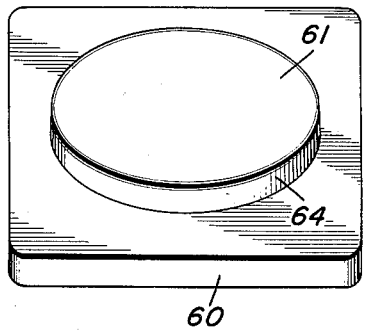
Figure 8 is a perspective view of the base used in connection with the parts in Figures 6 and 7.
Figure 9:
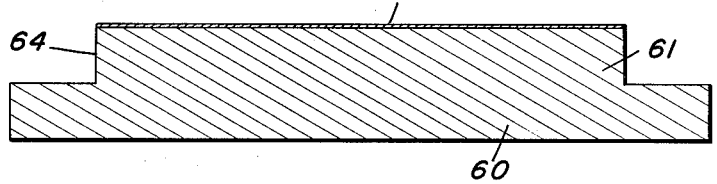
Figure 9 is a longitudinal sectional view showing the second embodiment of the invention which is ready to receive the dough.
Figure 10:
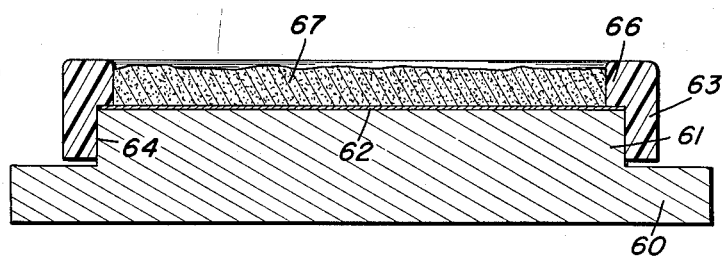
Figure 10 is the same type of sectional view as Figure 9 but showing a second step in the operation.
Figure 11:
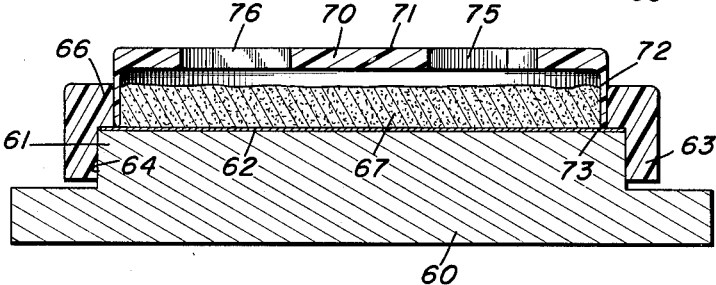
Figure 11 is a longitudinal sectional view as in Figure 10 but showing a further step.
Figure 12:
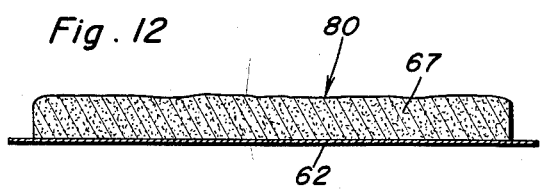
Figure 12 is a longitudinal sectional view illustrating the finished product which is in readiness for cooking.

In the accompanying drawings there are two appliances, each of which demonstrates the principles of the invention. The embodiment of Figures 1–5 differs from the embodiment of Figure 6 principally in that the first embodiment has a cutter which is used to sever the tinfoil, aluminum foil or other metal backing for the food product. In Figure 1 there is an appliance 10 which has a base panel 12 with an upstanding disk 14. A ring 16 of rather hard plastic for example, polystyrene or nylon or others, is around the periphery of disk 14 and forms an anvil for cylindrical cutter 18. An intermediate plate 20 is connected by hinge 21 to the edge of base 12 and for convenience there is a handle 24 protruding from one edge thereof. Central, circular aperture 26 is formed in plate 20 and is of a dimension to fit over the ring 16. A final part of the appliance is upper plate 28 which is connected by a hinge 29 to the plate 20 and which has a downwardly opening recess 32 therein forming an excess dough pocket. The cylindrical cutter 18 is fixed, as by fasteners 36 to the inside surface of the circular aperture 38 in plate 28. The cylindrical cutter depends through recess 32 and is adapted to be brought against the upper surface of ring 16 functioning as the previously mentioned anvil.

Figure 4:
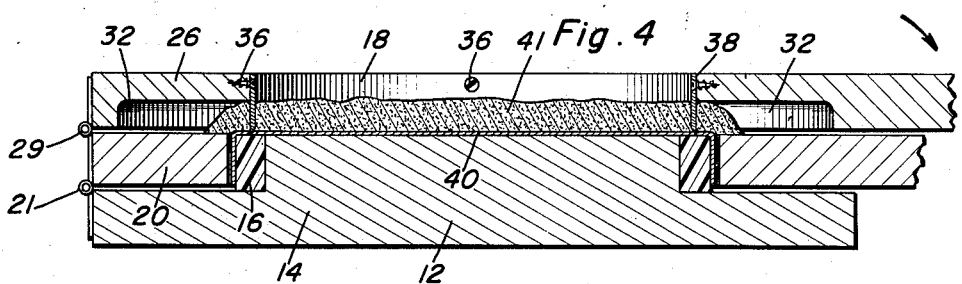
Figure 4 is a longitudinal sectional view showing the third step.
Figure 5:
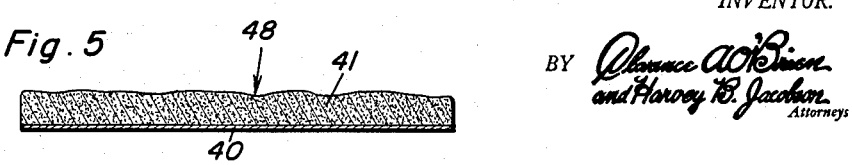
Figure 5 is a sectional view showing the completed tortilla which is ready to be cooked after separation from the appliance of Figure 1.

In use the base 12 is placed on a supporting surface, for example on a table. A sheet 40 of tinfoil, aluminum foil or other analogous material is placed over the upper surface of disk 14 and over the anvil 16. Then the former plate 20 is brought down so that the opening 26 therein folds the edges of the sheet 40 down around the cylindrical surface of the ring 16. Thereafter a quantity of dough 41 made in accordance with culinary recipes, is placed over the sheet 40. Finally, the upper plate having cutter 18, is brought down so that the cutter 18 has its cutting edge on the upper surface of collar 16 (Fig. 4), which functions as an anvil. At this time the excess dough is severed from the dough 41 and is received in the excess dough recess 32 (Figure 4). At the same time the sheet 40 is severed in a perfect circle or other shape depending on the shape of the parts, leaving the tortilla 48 or other food product which is made in this way.

Attention is now invited principally to Figures 6–12. This embodiment consists of a base plate 60 having an upstanding disk 61 integral therewith or otherwise joined thereto. The sheet 62 of tinfoil, aluminum foil or an equivalent material is first precut and placed on the top surface of the disk 61. Then collar 63 is placed on the disk 61, this collar having an inner cylindrical surface 64 which fits snugly on the outer cylindrical surface of the disk 61. An inwardly directed flange 66 is at the upper part of collar 63 and overlies the periphery of the sheet 62. Thereafter the dough 67 is placed on sheet 62 and within the confines of the collar 63.

The next step is to utilize the top plate 70. This top plate 70 has a top wall 71 with a cylindrical wall 72 extending from the periphery thereof. This cylindrical wall has a sharp cutting edge 73 which fits between the inner surface of flange 66 and the dough 67 on sheet 62. Air holes 75 and 76 are formed in the top wall 71 of the upper plate so as to avoid the formation of vacuum which would be caused when the top plate is withdrawn suddenly. After inserting the plate having the cutting edge 73 in this manner, the top plate 70 is removed leaving a food product 80 shaped as in Figure 12, this food product being automatically backed by means of the precut sheet 62.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. For use in making tortillas, tacos and other similar food products, an appliance comprising a base, a disk rising from said base, a collar surrounding said disk and functioning as an anvil, said disk and said anvil adapted to support a film of metal foil with dough deposited thereon, a former plate having an opening of slightly larger size than said collar and adapted to be brought in superposition to said base with said disk and anvil passed through said opening to thereby fold said foil around the sides of said anvil, and a cutter adapted to be brought down on said anvil to sever the dough to shape and size and to sever the foil on the upper surface of said anvil.

2. The appliance of claim 1 wherein said anvil is made of plastic material and said cutter is cylindrical and has a cutting edge adapted to be brought against the plastic anvil when severing said foil.

3. An appliance to facilitate making foil backed food products, said appliance comprising a base provided with an upper surface, an upwardly extending member rising from said upper surface of said base, the surface of said member adapted to accommodate a sheet of foil on which a severable food substance may be placed, a plate movably related to said base and having an opening into which said member enters when said plate is moved onto the base and by which the edge portions of the foil are bent, a second plate, means movably relating said second plate to said first mentioned plate, anvil forming means at the peripheral part of said member, a cutter carried by said second plate and engageable with said anvil forming means to sever the edges of the food substance on the foil and to sever the edge portions of the foil to thereby separate the bent portions of the foil from the remainder of the foil that rests on said member on said base.

4. The appliance of claim 3 wherein said second plate has a surface adjacent to said first plate and a recess opening therethrough which confronts said first plate and which is located outwardly of said cutter to admit the excess food substance which is severed by said blade.

5. The appliance of claim 3 wherein there are hinges connecting said base to said first mentioned plate and said first mentioned plate to said second plate respectively thereby hingedly connecting said base and both of said plates.

References Cited in the file of this patent

UNITED STATES PATENTS

| | | |
|---|---|---|
| 25,767 | Shrote | Oct. 11, 1859 |
| 216,729 | Edmands | June 24, 1879 |
| 789,485 | Burry | May 9, 1905 |
| 1,228,288 | Bower | May 29, 1917 |
| 1,757,447 | Comstock | May 6, 1930 |
| 1,959,011 | Trompeter | May 15, 1934 |
| 2,054,756 | Kremer | Sept. 15, 1936 |
| 2,147,098 | Humphrey | Feb. 14, 1939 |
| 2,225,710 | Norris | Dec. 24, 1940 |
| 2,415,788 | Champer | Feb. 11, 1947 |
| 2,803,202 | Schafer | Aug. 20, 1957 |